US007227690B2

(12) United States Patent
Schilling et al.

(10) Patent No.: US 7,227,690 B2
(45) Date of Patent: Jun. 5, 2007

(54) LAYER ARRANGEMENT PROVIDED WITH A STRUCTURE PRODUCING A DIFFRACTIVE OPTICAL EFFECT AND A LENS-TYPE EFFECT

(75) Inventors: Andreas Schilling, Hagendorn (CH); Wayne Robert Tompkin, Baden (CH)

(73) Assignee: OVD Kinegram AG, Zug (CH)

( * ) Notice: Subject to any disclaimer, the term of this patent is extended or adjusted under 35 U.S.C. 154(b) by 0 days.

(21) Appl. No.: 10/535,732

(22) PCT Filed: Nov. 7, 2003

(86) PCT No.: PCT/EP03/12451

§ 371 (c)(1),
(2), (4) Date: May 20, 2005

(87) PCT Pub. No.: WO2004/049250

PCT Pub. Date: Jun. 10, 2004

(65) Prior Publication Data

US 2006/0072225 A1 Apr. 6, 2006

(30) Foreign Application Priority Data

Nov. 22, 2002 (DE) ................................ 102 54 499

(51) Int. Cl.
*G02B 27/00* (2006.01)

(52) U.S. Cl. ...................... 359/576; 359/569; 359/565; 359/572

(58) Field of Classification Search ................ 359/565, 359/566, 569, 571, 572, 576
See application file for complete search history.

(56) References Cited

U.S. PATENT DOCUMENTS

| | | | |
|---|---|---|---|
| 4,714,656 A | 12/1987 | Bradshaw et al. | |
| 4,765,656 A | 8/1988 | Becker et al. | |
| 6,324,004 B1 | 11/2001 | Staub et al. | |
| 2005/0073746 A1* | 4/2005 | Kleemann et al. | 359/565 |

FOREIGN PATENT DOCUMENTS

| | | |
|---|---|---|
| DE | 199 49 945 A1 | 8/2001 |
| EP | 1 076 315 A1 | 2/2001 |
| EP | 1 152 369 A1 | 11/2001 |
| EP | 1 182 054 A2 | 2/2002 |
| WO | WO 94 27254 | 11/1994 |
| WO | WO 97 19820 | 6/1997 |
| WO | WO 99 15919 | 4/1999 |

* cited by examiner

*Primary Examiner*—Fayez G. Assaf
(74) *Attorney, Agent, or Firm*—Hoffmann & Baron, LLP

(57) ABSTRACT

A layer arrangement is proposed, particularly for transfer films or laminated films, which exhibits at least two superposed synthetic resin layers, between which there is provided an interface surface having a refractive structure producing a lens-like effect, the novelty claimed being a special design of the structure having a diffractive effect.

29 Claims, 1 Drawing Sheet

LAYER ARRANGEMENT PROVIDED WITH A STRUCTURE PRODUCING A DIFFRACTIVE OPTICAL EFFECT AND A LENS-TYPE EFFECT

CROSS-REFERENCE TO RELATED APPLICATIONS

This application is a National Phase application of International Application No. PCT/EP2003/012451 filed Nov. 7, 2003, which claims priority based on German Patent Application No. 102 54 499.9, filed Nov. 22, 2002, which are incorporated herein by reference.

BACKGROUND OF THE INVENTION

The invention relates to a layer arrangement, especially for implementation in transfer films or laminated films, which exhibits at least two superposed material layers, of which at least that (or those) facing the observer in use has or have a transparent or semi-transparent appearance, and between which an interface is formed which exhibits, in at least one area thereof, a diffractive optical structure producing some lens-like effect, either magnifying or de-magnifying.

In this context, transfer films include especially so-called embossing films, which consist of a base film and a transfer layer that is detachable from the base film for transference to a substrate. Usually the transfer layer of embossing films is composed of lacquer layers, which means that, in the present invention, the term "material layer" principally means lacquer layer, and at times also adhesive layer. However, the invention also encompasses other embodiments, in which a "material layer" is formed by ambient air or a metallic, dielectric, or semiconductor coating. The structure of laminated films coincides substantially with that of transfer films, with the exception however that the synthetic resin layers or lacquer layers are not detachable from the base film, but rather can be affixed together with the base film to a substrate. Transfer films and laminated films with layer arrangements of this sort are in particular used for security purposes, although they are also used in decorative applications.

Layer arrangements of the type mentioned above are currently known and are coming into use, for example, in the form of a lens having a uniform appearance and used as security device in credit cards (Amex-Blue) new on the market. In these credit cards, the lens-like effect is manifested over an area of comparatively large diameter, and has substantially the form of a circular lens. In the lens-like effect produced by diffractive optical structures of known layer arrangements, a structure produced by a holographic technique is used, which in general possesses a sinusoidal surface profile. Such holographically manufactured lenses have many shortcomings, quite apart from the fact that the holographic manufacture of diffractive optical structures with lens effects, with comparably small technical effort, is only possible when lenses having circular or, at best, elliptical shapes are involved. One drawback of holographically produced lenses is, for example, that they are not very bright in appearance and in general they exhibit irregularities, especially in the central area, whereby the visual effect that the lens should produce is considerably degraded. A further disadvantage of holographically produced lenses is that it is virtually impossible to achieve certain color effects with any great freedom of design.

SUMMARY OF THE INVENTION

It is an object of the invention to provide an arrangement of layers of the above mentioned type which does not have the described disadvantages of the known, holographically-produced lens structures having sinusoidal surface profiles, ie to design the structures giving the lens-like effect in a way that allows them to be produced in reasonable time with workable technology, in very precise and varied forms, causes the efficiency and brightness of the effects due to the lens-like structure to be much improved in comparison with the effects produced by holographically produced structures, and, finally, provides at least considerably greater freedom in the production of color effects than is possible with holographically produced structures.

This object is achieved, according to the invention, by the proposal that the diffractive optical structure producing the lens-like effect (hereinafter referred to as "lens structure"), be designed such that the grating structure, including the line frequency and, as necessary, other grating constants, be varied continuously over the surface of the structure to form a binary structure or some similar structure in which one of the walls of each grating groove run parallel to each other and approximately parallel to a perpendicular to the principal plane of the interface layer, while, at least as an average value taken over the entire groove wall, the angle of the other wall of each grating groove relative to a perpendicular to the principal plane of the interface layer varies substantially continuously, the grating depth (9) being not greater than 10 μm.

"Binary structure" in the present description is understood to mean a structure in which the grating grooves and the grating bars have substantially rectangular cross sections, whilst for the production of lens effects the grating constants will have to be continuously varied from the center of the lens to its edge, however, which in general means that both the groove width and the bar width will vary in binary gratings. Sufficiently fine binary gratings are easily produced with the use of appropriate masks, which results not only in much greaster accuracy, but also in comparatively lower manufacturing costs.

The other claimed embodiment of the grating structures will preferably be produced by means of the so-called "direct-writing" process, employing laser beam or electron beam lithographic printers. When using these methods, it is easy to produce very precise grating structures, especially the structure claimed herein, in which one wall of each of the grating grooves runs approximately perpendicular to the principal plane of the lens-forming grating, while the other wall is at a slant causing tapering of the grating groove toward the grating base. In this connection it is also possible to form the oblique walls not with a continuous profile, but rather to approximate a stepwise arrangement, and for many applications partitioning in four or eight steps will suffice. However, it is also possible, where high quality is required, to provide, say, 64 steps.

Regarding the design of such gratings reference is made, for the sake of simplicity, to FIG. 1, in which drawing a) shows the cross section of a normal, refractive lens, while the middle drawing b) shows diagrammatically the cross section of a diffractive lens with one wall of each grating groove running perpendicular to the principal plane of the grating while the opposing wall runs obliquely. In drawing c) of FIG. 1, a so-called "binary structure" is shown, in which the grating grooves and the grating bars both exhibit rectangular cross sections and, as can be seen in FIG. 1*c*), the width of the grating bars and the width of the of the grating grooves decrease from the center of the lens to its edge. All three of the lens forms shown in FIG. 1 produce fundamentally the same optical effect for any particular wavelength.

However, what is special about the invention's proposed diffractive lens structures is that, unlike refractive lenses, they create different visual impressions depending on the wavelengths of light that are present. Nevertheless, the height of diffractive lenses patterned after the designs shown in FIG. 1*b*) and FIG. 1*c*) is many times smaller than the thickness of the corresponding refractive lens illustrated in FIG. 1*a*). Through this method, it is for the first time possible to integrate the lens structure into a layer arrangement without having to work with extreme layer thicknesses, which must be regarded as being impossible for all practical purposes.

When lens structures according to the invention are used, the first advantage obtained is that higher efficiency than that achievable by holographically manufactured lenses can be achieved, which consequently means that the picture, decorative effect, or security effect made with the aid of the lens will be brighter. Another advantage is that the lens structures according to the invention can be produced with very great accuracy in comparison with holographically produced structures—whereby the visual appearance is significantly improved. A final advantage is that by suitably selecting the grating constants (line frequency, groove depth, etc) it is possible, with the structures of the invention, to achieve special color effects, or to control the color effects in a predetermined way over the overall profile of the lens structure. Furthermore, in this connection one should mention the possibility of combining lens structures with other elements that produce optical effects, eg other types of diffractive structures for achieving motion effects, flips, or similar effects, or with thin-film structures for producing special color effects, as is generally known from, say, optically variable security devices. The lens structures of the invention thus have, in comparison with holographically produced structures, besides the commonality of their small "thickness", a large number of advantages.

Layer arrangements having lens structures according to the invention can produce the pertinent special optical effects for observation in transmission as well as in reflection. To make viewing in transmitted light possible, the invention proposes that the layers adjacent the interface layer be transparent and show a distinct difference in their refractive indices of, preferably, at least 0.2. The difference in refractive index causes the lens action of the interface to produce a distinctly visible optical effect, in spite of the fact that the light passes through the layer arrangement. A special feature of working in transmission is that the grating need not be covered on one side, but can instead be exposed to air.

It is further within the scope of the invention that the interface, at least over some of its area, has a reflectivity-enhancing layer, an expedient reflectivity-enhancing layer being a metallic layer, for example one produced by vapor-deposition. However, it is by all means conceivable to consider a transparent reflectivity-enhancing layer having an appropriately high refractive index, in which case, the layer arrangement could be made transparent to a certain degree. Thin-film arrangements of known layer combinations or semiconductor layers could also be used.

The holographically produced security device in known credit cards, which is made using conventional layer arrangements, contains only a single, circular lens structure. On the other hand, using a diffractive lens structure of the invention, it is possible to place a plurality of lens structures over the surface of the layer arrangement, by which means much more interesting effects can be achieved (for use in decorative applications) or, where the lens structure is part of a security device, an enhanced security effect can be attained. Advantageously, in the latter case, the multiple lenses can be arranged gridwise, so that verification can be made easier. Alternatively, at least partially overlapping areas of the lens structures are conceivable, in which case even nesting might be achieved such that different lens structures would appear at different angles of observation.

The manufacture of such lens structures or lens structure arrangements will be particularly easy if, as proposed by the invention, the lens structures are substantially circular, taking the form of concentric grating lines.

In practice, it has proven to be expedient if the diameter of the lens structures lies between 0.15 and 300 mm, and preferably between 3 and 50 mm.

If, as also provided by the invention, the grating depth of the lens structure is less than 5 μm, and preferably less than 3 μm, such grating structures can be readily incorporated into the lacquer layers, which have approximately this thickness, of transfer films or laminated films.

According to the invention, it is proposed that the binary structure have approximately the same depth over the entire surface of the lens structure. This facilitates manufacture greatly. The choice of the depth of the binary structure influences the color perceived by the observer looking at the lens structure.

Finally, it can be advantageous if the transparent layer (or layers) seen by observer is (are) colored without the use of pigment.

Other characteristics, details, and advantages of the invention will be apparent from the following description of examples of preferred embodiments with reference to the drawings, in which:

Figure 2:
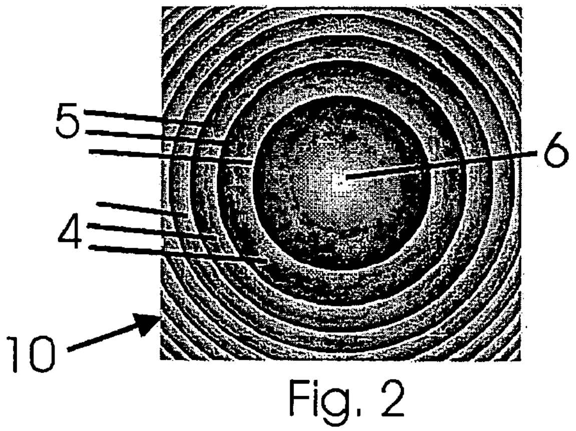
Figure 3:
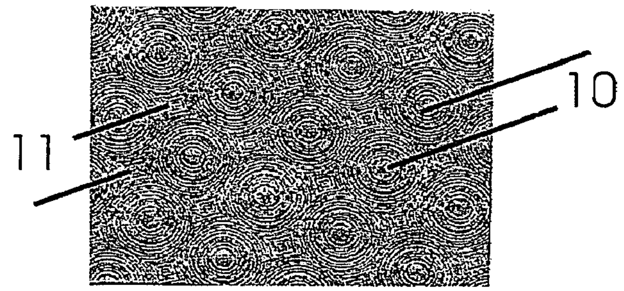

b) a diffractive lens having grating grooves of approximately triangular cross sections, and c) a lens with a diffractive binary structure;

FIG. 2 is a diagrammatic top view of a security device or decorative element with a layer arrangement of the invention and having a lens structure of the invention; and FIG. 3 is a representation similar to FIG. 2 but on a smaller scale, showing a grid-wise arrangement of a plurality of lens structures.

DETAILED DESCRIPTION OF THE INVENTION

Figure 1:
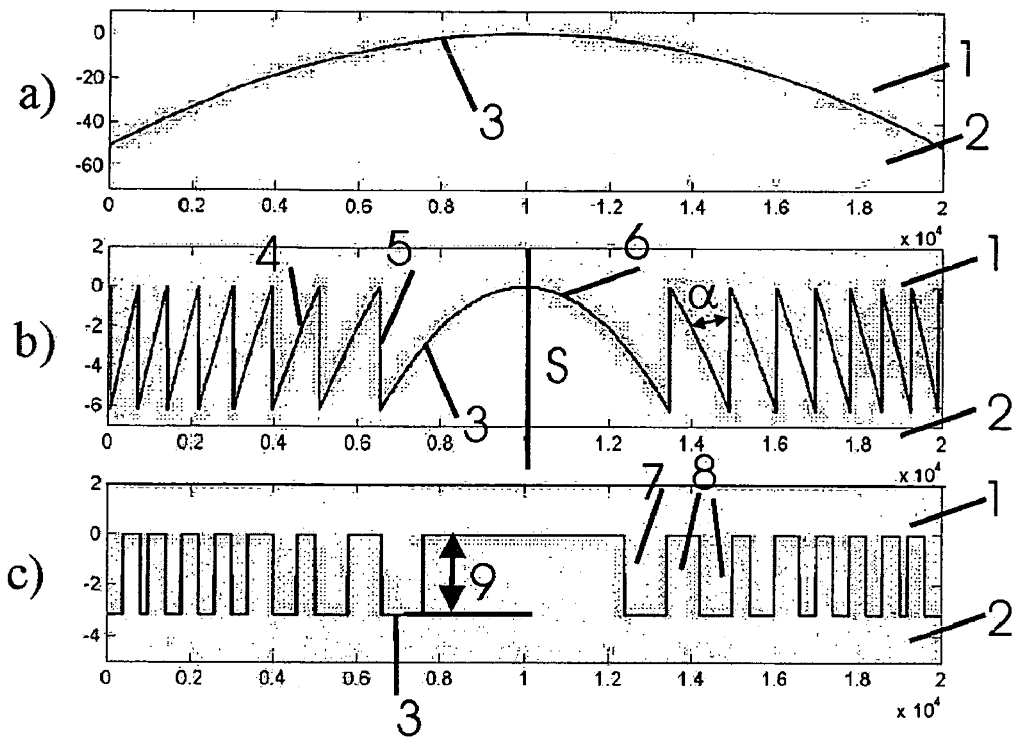
FIG. 1 shows diagrammatically and in cross section a) a refractive lens.

In the diagrammatic cross sectional views of FIG. 1 it is shown that the layer arrangement in accordance with the invention comprises two material layers 1 and 2, which form an interface layer 3 between them, which can be metallized for example, this being achieved by, say, vacuum metal vapor deposition. For certain applications the material layers 1 and 2 can be formed by air. The diameter of the lenses in FIG. 1 is specified along the x-axis in arbitrary units, as the exact size or diameter of the lens structure is not relevant. However, in general, the diameter of the lens structures lies between 0.5 and 300 mm, preferably between 3 and 50 mm, the focal length being usually between the value of the lens diameter and five times this value.

On the y-axis in FIG. 1, the thickness of the material layers 1, 2 or the height of the structure is given, with the values representing the phase difference in radians. By using a particular wavelength of light (eg 550 nm for the maximum sensitivity of the human eye) one can calculate the geometric depth from this phase difference in known manner (including accounting for the corresponding refractive indices). From a comparison of FIG. 1*a*) with FIGS. 1*b*) and 1*c*), it is clear that the thickness of the layer arrangement represented in 1*a*) must be at least ten times greater than the thickness of the layer arrangement represented in 1*b*) and approximately twenty times greater than the thickness of the layer arrangement of FIG. 1*c*). That the layer arrangements of FIGS. 1*b*) and 1*c*) can be substantially thinner than that of FIG. 1*a*) has to do with the small overall height 9 of the lens structure due to the interface layer 3, which covers a height that, calculated for FIG. 1*b*) (for a system n=1.5/n=1 in transmission), is only approximately twice the wavelength, and calculated for FIG. 1*c*), is approximately equal to the wavelength.

Layers 1 and 2 of the layer arrangement are in general lacquer layers of appropriate composition, with at least the layer facing the observer (in the present cases usually layer 1) being substantially transparent, although it can be colored, if desired. For certain applications, one of the layers can be an adhesive layer and the layer facing the observer can be omitted.

If the interface layer 3 is metallized or provided with some other highly reflective coating, layer 2 can likewise be transparent or alternatively translucent or opaque. If, on the other hand, the layer arrangement according to the invention is used in transmission, for example as a cover of an existing visible characteristic on a substrate, layer 2 must also be transparent. In this case interface layer 3 would not have a metal coating, which is generally opaque. Instead, the two transparent layers 1 and 2 would be chosen such that their refractive indices differ (the difference in refractive index being preferably at least 0.2), so that, despite the use of two transparent layers, the effect produced by the interface layer 3 will be visible with adequate optical clarity.

The lens structure represented in 1*b*) is usually produced in a "direct writing process", ie in a process in which either, using a laser, the material is shaped by ablation to make it conform with the desired profile, or, using a laser or an electron beam lithographic printer, a photoresist patterned according to the desired profile is exposed and then the desired profile or its negative is obtained by developing the photoresist. This procedure offers the advantage that it can produce very different grating structures and, especially, very different grating cross sections, eg for certain applications so-called blazed gratings. Particularly noteworthy is the fact that the angle α formed between the oblique grating groove walls 4 and a perpendicular S to the principal plane of the lens structure can, as is clearly visible in FIG. 1*b*), vary continuously from the lens center to the edge, especially considering the fact that the grating groove walls 5 that run parallel to the perpendicular S form a quasi-discontinuity in an otherwise substantially smooth lens profile, formed by the other oblique grating groove walls 4, as well as the central parabolic section 6 of interface 3.

Such lens structures, as well as the way to compute them, are basically described in the literature, and so will not be treated further here.

Mention may be made of the possibility of using, instead of a continuous slant of walls 4 over their height 9, as shown in FIG. 1*b*), a step-shaped arrangement, in which the surfaces forming the steps approach the optical effect provided by slanting walls 4. Such grating structures can be produced either by use of the so-called direct-writing process or by using appropriate masking techniques, the number of steps being varied depending on the desired results. For many applications, a partition in four or eight steps is sufficient. Where higher quality is required, it is also possible to provide, say, sixty-four steps, or a number equal to a higher power of 2.

The binary structure represented in FIG. 1*c*) is produced by the use of appropriate masks. The essential characteristic of the binary structure, as shown in FIG. 1*c*), lies in the fact that both the grating grooves 7 and the grating bars 8 are essentially rectangular in cross section. Another special characteristic of the structure shown in FIG. 1*c*) is that the grating depth 9 is uniform over the entire lens structure, which offers the advantage, especially for fabrication, that neither is it necessary to employ different activation times for the material-removing medium nor is it necessary to work with different intensities of the medium passing through the mask to act on the substrate.

FIG. 2 is a diagrammatic drawing (in reality the spacing of the grating lines is much smaller) showing a lens-like element that is produced with a lens structure like that shown in FIG. 1*b*), with the top view of FIG. 2 clearly showing the steadily decreasing separation between the individual grating bars and the steadily increasing groove frequency from the center of the circular lens out to its edge. In addition, one can see how the inclination of the groove walls 4, which are visible in the plan view of FIG. 2, changes steadily and in a substantially continuous fashion, from the center of the lens outwards. The groove walls 5, which are perpendicular to the principal plane of the lens, are clearly visible in FIG. 2 as dark lines.

FIG. 3 shows a further possibility of how diffractive lens structures might be designed in a layer arrangement according to the invention.

In the application example shown in FIG. 3, which could, for example, be realized in a decorative transfer film or laminated film, circular lens structures, that in principle could have the lens structure of FIG. 2, are distributed over the surface of the film in a number of regions, which form a grid pattern. The arrangement is configured such that the outer grating grooves are not truncated, as is the case with some of the outer grooves shown in FIG. 2 The lens structures 10 of FIG. 3 are, on the contrary, all substantially circular. The spheroid-square spaces created between the circular lens structures by their adjacent placement are filled, in the layer arrangement of FIG. 3, with appropriately shaped diffractive structures 11, which can, if desired, also produce a lens effect, the lens structures 10 having for example the effect of converging lenses, while the structures 11 act as diverging lenses, by which means the optical effects of both lens types are quasienhanced.

It is obviously possible, by appropriately combining different lens structures, to produce layer arrangements showing complex optical effects, while it is naturally also possible to design other, locally defined, diffractive structures, that generate completely different kinds of effect, for example motion effects, flips, etc. It is also conceivable to combine the lens structures and/or other diffractive structures with a series of thin films of special colors, eg OVI, or with semiconductor layers, in order to achieve special color-changing effects.

Particularly interesting embodiments of the layer arrangement are produced when the interface layer 3 is only partially metallized. For example demetallization in register with the lens structures could be carried out.

Furthermore the lens structures obviously do not always have to be of a circular shape like those generally depicted in the drawings. A particular advantage gained by using diffractive lens structures is that they can be superposed over other forms (so-called free-form surfaces), in order to obtain, for example, configurations having a three-dimensional appearance. Furthermore it would also be conceivable, for example, to divide the lens structures of FIG. 2 into parts and to put these parts together in a different way, again obtaining very interesting optical effects.

What is claimed is:

1. A layer arrangement comprising:

a plurality of material layers, wherein at least one of the material layers is transparent to an observer facing the at least one material layer; and an interface surface formed between at least two of the material layers, wherein at least a portion of the surface includes a diffractive optical structure exhibiting a magnification altering effect to the observer, wherein the diffractive optical structure includes a grating structure, which is varied continuously to form a binary structure, wherein a depth of the grating structure is less than 10 μm.

2. A layer arrangement as defined in claim 1, wherein the layers adjacent the interface surface are transparent and exhibit a different refraction index.

3. A layer arrangement as defined in claim 1, wherein the interface surface is provided, at least in certain regions, with a reflectivity-enhancing layer.

4. A layer arrangement as defined in claim 3, wherein the reflectivity-enhancing layer is a metal layer.

5. A layer arrangement as defined in claim 1, wherein a number of diffractive optical structures are distributed over the interface surface.

6. A layer arrangement as defined in claim 5, wherein said diffractive optical structures are arranged grid-wise.

7. A layer arrangement as defined in claim 1, wherein the diffractive optical structure is substantially circular and has concentric grid lines.

8. A layer arrangement as defined in claim 1, wherein the diffractive optical structure has a diameter ranging from 0.15 to 300 mm, preferably from 3 to 50 mm.

9. A layer arrangement as defined in claim 1, wherein the grating depth is less than 5 μm.

10. A layer arrangement as defined in claim 1, wherein the binary structure has approximately the same depth over the entire area of the diffractive optical structure.

11. A layer arrangement as defined in claim 1, wherein the at least one transparent layer is colored without the use of pigments.

12. A layer arrangement comprising:

a plurality of material layers, wherein at least one of the material layers is transparent to an observer facing the at least one material layer; and an interface surface formed between at least two of the material layers, wherein at least a portion of the surface includes a diffractive optical structure exhibiting a magnification altering effect to the observer, wherein the diffractive optical structure includes a grating structure, which is varied continuously to form a plurality of grating grooves formed by opposed first and second walls, wherein the first walls run parallel to each other and approximately perpendicular to a principle plane of the interface surface, and wherein an angle of the second walls relative to a perpendicular to the principle plane varies substantially continuously over the surface, wherein a depth of the grating structure is less than 10 μm, and wherein the interface surface is provided, at least in certain regions, with a reflectivity-enhancing layer.

13. A layer arrangement as defined in claim 12, wherein the layers adjacent the interface surface are transparent and exhibit a different refraction index.

14. A layer arrangement as defined in claim 12, wherein the reflectivity-enhancing layer is a metal layer.

15. A layer arrangement as defined in claim 12, wherein a number of diffractive optical structures are distributed over the interface surface.

16. A layer arrangement as defined in claim 15, wherein said diffractive optical structures are arranged grid-wise.

17. A layer arrangement as defined in claim 12, wherein the diffractive optical structure is substantially circular and has concentric grid lines.

18. A layer arrangement as defined in claim 12, wherein the diffractive optical structure has a diameter ranging from 0.15 to 300 mm, preferably from 3 to 50mm.

19. A layer arrangement as defined in claim 12, wherein the grating depth is less than 5μm.

20. A layer arrangement as defined in claim 12, wherein the at least one transparent layer is colored without the use of pigments.

21. A layer arrangement comprising:

a plurality of material layers, wherein at least one of the material layers is transparent to an observer facing the at least one material layer; and an interface surface formed between at least two of the material layers, wherein at least a portion of the surface includes a diffractive optical structure exhibiting a magnification altering effect to the observer, wherein the diffractive optical structure includes a grating structure, which is varied continuously to form at least one of a first and second structure, the first structure including a binary structure, the second structure including a plurality of grating grooves formed by opposed first and second walls, wherein the first walls run parallel to each other and approximately perpendicular to a principle plane of the interface surface, and wherein an angle of the second walls relative to a perpendicular to the principle plane varies substantially continuously over the surface, wherein a depth of the grating structure is less than 10 μm, and further wherein the interface surface which includes the second structure is provided, at least in certain regions, with a reflectivity-enhancing layer.

22. A layer arrangement as defined in claim 21, wherein the layers adjacent the interface surface are transparent and exhibit a different refraction index.

23. A layer arrangement as defined in claim 21, wherein the reflectivity-enhancing layer is a metal layer.

24. A layer arrangement as defined in claim 21, wherein a number of diffractive optical structures are distributed over the interface surface.

25. A layer arrangement as defined in claim 24, wherein said diffractive optical structures are arranged grid-wise.

26. A layer arrangement as defined in claim 21, wherein the diffractive optical structure is substantially circular and has concentric grid lines.

27. A layer arrangement as defined in claim 21, wherein the diffractive optical structure has a diameter ranging from 0.15 to 300 mm, preferably from 3 to 50 mm.

28. A layer arrangement as defined in claim 21, wherein the grating depth is less than 5μm.

29. A layer arrangement as defined in claim 21, wherein the at least one transparent layer is colored without the use of pigments.

* * * * *